United States Patent [19]
Peiffer et al.

[11] Patent Number: 5,292,563
[45] Date of Patent: Mar. 8, 1994

[54] METALLIZABLE, TWIST WRAP, BIAXIALLY ORIENTED, POLYPROPYLENE FILM

[75] Inventors: Herbert Peiffer, Mainz-Finthen; Ursula Murschall, Nierstein; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 794,893

[22] Filed: Nov. 20, 1991

[30] Foreign Application Priority Data

Nov. 24, 1990 [DE] Fed. Rep. of Germany ....... 4037417

[51] Int. Cl.[5] ................ B32B 27/08; B29D 7/24
[52] U.S. Cl. .................... 428/35.9; 428/13; 428/349; 428/447; 428/461; 428/516; 428/910; 264/171; 264/210.6
[58] Field of Search ............ 428/516, 347, 447, 910, 428/461, 35.9; 264/171, 210.6, 211

[56] References Cited

U.S. PATENT DOCUMENTS

| | | | |
|---|---|---|---|
| 3,620,825 | 11/1971 | Lohmann et al. | 117/138.8 |
| 4,343,852 | 8/1982 | Isaka et al. | 428/216 |
| 4,400,428 | 8/1983 | Rosenthal et al. | 428/451 |
| 4,522,887 | 6/1985 | Koebisu et al. | 428/461 |
| 4,533,509 | 8/1985 | Gust et al. | 524/492 X |
| 4,786,533 | 11/1988 | Crass et al. | 428/447 |
| 4,966,933 | 10/1990 | Kawakami et al. | 428/461 |
| 4,975,315 | 12/1990 | Bothe et al. | 428/216 |

FOREIGN PATENT DOCUMENTS

| | | |
|---|---|---|
| 0021672 | 1/1981 | European Pat. Off. |
| 0122495 | 10/1984 | European Pat. Off. |
| 0217388 | 4/1987 | European Pat. Off. |
| 0317276 | 5/1989 | European Pat. Off. |
| 0348749 | 1/1990 | European Pat. Off. |
| 1231861 | 5/1971 | United Kingdom |

*Primary Examiner*—P. C. Sluby
*Attorney, Agent, or Firm*—Foley & Lardner

[57] ABSTRACT

A polypropylene multilayer, coextruded, transparent, and metallizable film which has isotropic mechanical properties and contains a low-molecular-weight hydrocarbon resin and an antistatic agent in the base layer and an antiblocking agent in the outer layer is described. The film is free from lubricants in the outer layers. The invention furthermore relates to a process for the production of such films and to their use as, for example, packaging films or twist wrapping.

28 Claims, No Drawings

METALLIZABLE, TWIST WRAP, BIAXIALLY ORIENTED, POLYPROPYLENE FILM

BACKGROUND OF THE INVENTION

The present invention relates to a multilayer, coextruded, transparent and metallizable film for twist wrapping which has isotropic mechanical properties and contains a low-molecular-weight hydrocarbon resin and an antistatic in the base layer and an antiblocking agent in the outer layers. The film contains no lubricants in the outer layers. The invention furthermore relates to a process for the production of such films and to their use.

The metallizable twist wrap film is a variant of the transparent film. Metal is vapor-deposited on the high-gloss, metallizable surface of the twist wrap film and is later printed. In this way, the wrapping is given a very attractive, eyecatching appearance, both from the inside and from the outside. From the outside, for example, the print stands out through greatly increased color brightness, while from the inside, the metal layer with a silvery luster, gives the impression of high hygiene.

The prior art does not disclose films having good twist properties, good metal-adhesive surfaces, and also good processing properties on high-speed twist-wrapping machines. For example, the publications GB-A-1,231,861, DE-A-35 35 472 and EP-A-317,276 describe transparent films for twist wrapping. The twisting behavior of these films is in need of improvement and the films are not adhesive to metal. On the other hand, the publications DE-A-17 69 028, EP-A-21,672, EP-A-122,495 and EP-A-282,917 describe readily metallizable, oriented polypropylene films (OPP films). However, these films are not suitable for twist wrapping and for processing on high-speed processing machines.

SUMMARY OF THE INVENTION

The object of the present invention is to provide a transparent, biaxially oriented, multilayer film having good twist properties in which at least one surface of the film has excellent adhesion properties, in particular, for metallic deposition.

Another object of the invention is to provide a process for producing the film.

In accomplishing the foregoing objectives, there has been provided, in accordance with one aspect of the present invention, a metallizable, biaxially oriented, transparent, multilayer film comprising:

a) a base layer comprising polypropylene, an antistatic agent, and a low-molecular weight hydrocarbon resin having a softening point of about 130° to about 180° C., and b) at least one additional layer comprising polypropylene and an anti-blocking agent, wherein each of the additional layers does not comprise lubricants.

In accordance with another object of the invention, there has been provided a process for producing the multilayer film comprising the steps of:

i) coextruding the melts corresponding to the individual layers of the multilayer film through a flat film die so as to produce a multilayer film, ii) solidifying the multilayer film on a chill roll, iii) orienting the solidified film in the longitudinal and transverse directions by stretching in such a manner that the film has isotropic properties in both directions, and optionally iv) surface treating one or both sides of the oriented multilayer film.

Further objects, features, and advantages of the present invention will become apparent from the detailed description of preferred embodiments that follows.

DETAILED DESCRIPTION OF THE PREFERRED EMBODIMENTS

The preferred polypropylene of the base layer is an isotactic propylene homopolymer or a copolymer comprising more than 50% by weight of propylene units. Such polymers preferably have a melting point of at least about 140° C., more preferably of at least 150° C. Typical examples of the preferred thermoplastic polypropylene of the base layer include isotactic polypropylene having an n-heptane-soluble content of less than about 15% by weight, copolymers of ethylene and propylene having an ethylene content of less than 10% by weight, and copolymers of propylene with other alpha-olefins having 4–8 carbon atoms and having a content of these alpha-olefins of less than 10% by weight.

The preferred polypropylene thermoplastics have a melt flow index in the range from 0.5 g/10 min to 8 g/10 min at 230° C. and a load of 21.6 N (DIN 53 735), more preferably from 1.5 g/10 min to 5 g/10 min.

The low-molecular-weight resin present in the base layer is a natural or synthetic resin having a softening point of from 130° to 180° C., preferably from 140° to 160° C. (determined in accordance with ASTM E 28). The resins preferably have a number average molecular weight of 200 to 2000. Of the numerous low-molecular-weight resins, hydrocarbon resins are preferred, preferably in the form of petroleum resins (these resins are described in Ullmanns Enzyklopädie der Techn. Chemie [Ullmann's Encyclopedia of Industrial Chemistry], 4th Edition, Volume 12, pages 525 to 555).

Other hydrocarbon resins which can be employed include styrene homopolymers, styrene copolymers, cyclopentadiene homopolymers, cyclopentadiene copolymers, and/or terpene polymers, in each case having a softening point of from 130° to 180° C., preferably from 140° to 160° C. Of the unsaturated polymers, the hydrogenated product is preferred.

The petroleum resins are hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene, and/or pentylene. The styrene resins are low-molecular-weight homopolymers of styrene or copolymers of styrene with other monomers, such as α-methylstyrene, vinyltoluene, and/or butadiene. The cyclopentadiene resins are cyclopentadiene homopolymers or cyclopentadiene copolymers obtained from coal tar distillates and fractionated petroleum gas. These resins are prepared by keeping the materials containing cyclopentadiene at an elevated temperature for a long time. Depending on the reaction temperature, dimers, trimers, or oligomers can be obtained.

The terpene resins are polymers of terpene, i.e., hydrocarbons of the formula $C_{10}H_{16}$, which are present in virtually all etherial oils or oil-containing resins from plants, and phenol-modified terpene resins. Specific examples of terpenes include α-pinene, β-pinene, dipentene, limonene, myrcene, camphene, and similar terpenes.

The hydrocarbon resins may also be so-called modified hydrocarbon resins. The modification is generally carried out by introducing specific monomers before the polymerization of the raw materials of the hydrocarbon, or by reacting the polymerized products. Preferred reactions are hydrogenations or partial hydrogenations.

The effective amount of low-molecular-weight resin is generally from 5 to 30% by weight, more preferably from 10 to 25% by weight, based on the total weight of the base layer.

The addition of low-molecular-weight resin improves the mechanical properties, such as modulus of elasticity and tear strength of the film. On the other hand, the addition of resin significantly reduces the elongation at break, i.e., the film becomes brittle. This is desirable for twist wrapping.

The hydrocarbon resin advantageously has a high softening point, preferably of greater than 140° C. This allows the use of a higher transverse stretching temperature and thus reduces shrinkage in the film. Low shrinkage is desirable since otherwise the twistability of the film suffers on printing due to shrinkage commencing in the film. A preferred transverse stretching temperature when such a resin having a high softening point is used is 140° to 145° C. It has been observed that the film becomes hazy if a resin having a lower softening point, for example 120° C., is used and if the stretching is carried out at the above-mentioned higher temperatures.

In order to improve the smoothness of passage through the machine, the base layer contains an antistatic agent in an effective amount, generally in the range from 0.05 to 0.1% based on the weight of the layer. Surprisingly, it has been found that when the antistatic is used, the passage through the machine is still smooth, and the metal adhesion is not impaired by the substance migrating to the surface.

If the antistatic content is significantly less than 0.05%, it is not possible for a sufficient amount of antistatic to reach the surface to ensure adequate slip and smooth passage through the machine. If the content is significantly greater than 0.1%, the passage through the machine is excellent, but the metal adhesion is increasingly impaired.

Preferred antistatics include alkali metal alkanesulfonates; polyether-modified, i.e., ethoxylated and/or propoxylated, polydiorganosiloxanes such as polydialkylsiloxanes, polyalkylene-phenylsiloxanes and the like; and/or essentially straight-chain and saturated, aliphatic, tertiary amines containing an aliphatic radical having 10 to 20 carbon atoms, which are substituted by $\omega$-hydroxy-$(C_1-C_4)$-alkyl groups, among which N,N'-bis(2-hydroxyethyl)alkylamines having 10–20, preferably 12–18, carbon atoms in the alkyl moiety are particularly suitable.

The outer layers comprise, for example, polypropylene homopolymer or ethylene/propylene copolymers in an amount of at least 95%. The copolymer preferably has an ethylene content of less than 10%.

The outer layers may in addition contain the above-described low-molecular-weight resin. This improves, in particular, the optics of the film.

The outer layer thickness should be as low as possible, because it has been observed that the thicker the outer layers, the greater the impairment of the twistability of the film. Accordingly, outer layer thicknesses of less than 0.5 $\mu$m are preferred.

The outer layers are, according to the invention, free from any lubricants and contain only an antiblocking agent, which ensures smooth passage through the machine.

Suitable antiblocking agents include inorganic additives, such as silicon dioxide, calcium carbonate, magnesium silicate, aluminum silicate, calcium phosphate and/or the like; nonionic surfactants; anionic surfactants; and/or organic polymers which are incompatible with the polymer of the layer, such as polyamides, polyesters, polycarbonates, and/or the like. The effective amount of antiblocking agent is preferably in the range from 0.1 to 0.5% by weight, based on the layer. Preferred antiblocking agents are particles having a mean diameter of about 1 to 4 microns.

It is expedient for the metallization to pretreat the film before printing. Examples of suitable pretreatment methods are flame treatment in the case of PP outer layers and flame or corona treatment in the case of PE/PP outer layers. The application of both the methods is carried out in such a manner that the surface to be metallized preferably has a surface tension of 36 to 50 mN/m, more preferably 38 to 42 mN/m, directly after the production of the multilayer film.

The multilayer film may be made by any known process. A preferred process according to the invention comprises first producing a prefilm by coextrusion from a flat film die and solidifying the film on a chill roll, and subsequently orienting the film in the longitudinal and transverse directions by stretching. The conditions in the longitudinal and transverse directions are chosen in such a manner that the film has isotropic properties in both directions. The prerequisites for achieving very good twist properties are then particularly favorable.

In addition, it has been shown that the twistability is better the greater the longitudinal stretching of the film. Accordingly, the longitudinal stretching ratios are preferably 6 to 9, more preferably 6.5 to 8.0. The transverse stretching ratios should also be correspondingly chosen. A preferred range here is also 6.5 to 8.0. High transverse stretching, as is the case in packaging films of the prior art, has proven disadvantageous for use of the films as twist wrap films. For example, the use of a longitudinal stretching ratio of $\lambda_l = 5$ and a transverse stretching ratio of $\lambda_t = 10$ gives a film having poor twistability, even if large amounts of resin are added.

The twistability of the film can be described very well by two physical parameters. Specifically, the twistability is better the greater the residual elongation and the lower the elongation at break. Preferably the values for these two physical parameters should be approximately equal in both directions.

Good twistability is obtained if the residual elongation values in both directions are greater than 60%. The films preferably have elongation at break values in both directions of less than 100% and more preferably less than 90% (the elongation at break is determined, like the modulus of elasticity and the tear strength, in accordance with DIN 53 455). The two parameters, elongation at break and residual elongation, should preferably differ from one another by a maximum of 10%.

The optical properties of the films according to the invention are surprisingly good. The gloss value is preferably greater than 110, more preferably greater than 115 and most preferably greater than 120, determined in accordance with DIN 67 530 at a measurement angle of 20°. The haze is generally less than 2%, determined by the Gardner method (ASTM D 1003-52).

The low shrinkage values of the films according to the invention also contribute to an improvement over films of the prior art.

The metal layer applied to at least one surface layer during metallization may comprise any suitable metal. Preference is given to layers of aluminum, zinc, gold, or silver, or corresponding alloys, with aluminum or aluminum-containing alloys being particularly preferred. Suitable metallization methods are electroplating, sputtering, and vacuum deposition, with the latter being preferred.

The thickness of the metal layer is preferably from about 20 to about 600 nm, preferably from 25 to 100 nm.

The invention is described in greater detail below with reference to an example.

EXAMPLE 1

A three-layer film having an overall thickness of 25 μm was produced by coextrusion and subsequent stepwise orientation in the longitudinal and transverse directions. The outer layers each had a thickness of 0.4 μm.

Composition of the Base Layer (Layer A)

79.92% by weight of isotactic polypropylene homopolymer

20% by weight of hydrogenated cyclopentadiene resin having a softening point of 140° C. (®Escoroz ECR 356, Exxon)

0.08% by weight of N,N'-bis(2-hydroxyethyl)-($C_{12}$-$C_{18}$)alkylamine

The melt flow index of the mixture is $I_2 = 10$ g/10 min or $I_5 = 50$ g/10 min Composition of the Outer Layers (Layers B)

99.7% by weight of random ethylene-propylene copolymer having a $C_2$ content of 4.5% by weight 0.3% by weight of $SiO_2$ as antiblocking agent, having a mean particle size of 3 μm The melt flow index of the outer layer is $I_2 = 12$ g/10 min or $I_5 = 60$ g/19 min.

The preparation conditions in the individual process steps are:

| Extrusion: | temperature of layer A: | 190° C. |
|---|---|---|
| | temperature of layer B: | 270° C. |
| | temperature of the take-off roll: | 30° C. |
| Longitudinal stretching: | temperature T = 110° C. | |
| | longitudinal stretching ratio $\lambda_l$ = 6.5 | |
| Transverse stretching: | temperature T = 140° C. | |
| | transverse stretching ratio $\lambda_t$ = 7.3 | |
| | convergence 15% | |
| Fixing: | temperature T = 110° C. | |

The film produced in this way has the properties listed in the table. The film was subjected to a corona treatment of 10 kHz and 10 kV in order to ensure printability, before being rolled up. The surface tension of the film as a consequence of this treatment is 40 mN/m.

The shrinkage is measured after the film has been stored in a circulating-air oven at 120° C. for 15 minutes.

In order to measure the residual elongation, a 15 mm wide strip was cut out of the film transversely to the machine direction and clamped in a tensile testing machine, with the distance between the clamps being 200 mm. The sample was then stretched at 20 mm/min, corresponding to 10%/min. After an elongation of 10%, i.e., at a sample length of 220 mm, the sample was automatically relaxed at the same rate. The residual elongation is determined from the stress-strain diagram. The residual elongation is calculated from $$E_r = \frac{x\%}{10\%} \cdot 100\%$$

where
$E_r$ = residual elongation
$x$ = % residual elongation
In the table:
+ + denotes very good

TABLE 1

| | Residual elongation % | | Modulus of elasticity N/mm² | | Tear strength N/mm² | | Elongation at break % | | Shrinkage % | | Gloss | Haze % | Quality of the twist wrapping |
|---|---|---|---|---|---|---|---|---|---|---|---|---|---|
| | long. | transv. | long. | transv. | long. | transv. | long. | transv. | long. | transv. | | | |
| Example 1 | 61 | 62 | 3200 | 3400 | 205 | 215 | 95 | 78 | 11 | 7 | 118 | 1.5 | + + |

What is claimed is:

1. A metallizable, biaxially oriented, transparent, multilayer film comprising:
   a) a base layer consisting essentially of polypropylene, an antistatic agent, and a low-molecular weight hydrocarbon resin having a softening point of about 130° to about 180° C., and
   b) an additional layer comprising polypropylene and an antiblocking agent, wherein said additional layer does not contain lubricants.

2. A multilayer film as claimed in claim 1, wherein said antiblocking agent has a mean particle diameter of about 1 to about 4 μm.

3. A multilayer film as claimed in claim 1, wherein said polypropylene of said base layer is selected from the group consisting of isotactic propylene homopolymers, copolymers of ethylene and propylene having an ethylene content of less than about 10% by weight, and copolymers of propylene with ($C_4$–$C_8$)-alpha-olefins, having a ($C_4$–$C_8$)-alpha-olefin content of less than about 10% by weight.

4. A multilayer film as claimed in claim 1, comprising about 5 to about 30% by weight of said hydrocarbon resin, based on the weight of the base layer.

5. A multilayer film as claimed in claim 1, wherein said hydrocarbon resin has a number average molecular weight of about 200 to about 2000.

6. A multilayer film as claimed in claim 1, wherein said hydrocarbon resin comprises a petroleum resin.

7. A multilayer film as claimed in claim 1, comprising about 0.05 to about 0.1% by weight of said antistatic agent, based on the weight of said base layer.

8. A multilayer film as claimed in claim 1, wherein said antistatic agent is selected from the group consisting of N,N,-bis-hydroxy-($C_1$–$C_4$)-alkyl-N-($C_{10}$–$C_{20}$)-alkylamines or mixtures thereof.

9. A multilayer film as claimed in claim 1, wherein said polypropylene of said additional layer is selected from the group consisting of isotactic propylene homopolymers, copolymers of ethylene and propylene having an ethylene content of less than about 10% by weight, and copolymers of propylene with ($C_1$–$C_4$)- alpha-olefins, having a (C$_4$–C$_8$)- alpha-olefin content of less than about 10% by weight.

10. A multilayer film as claimed in claim 1, wherein said additional layer comprises about 0.1 to about 0.5% by weight of the layer of said antiblocking agent.

11. A multilayer film as claimed in claim 1, wherein said antiblocking agent is silicon dioxide.

12. A multilayer film as claimed in claim 1, wherein said additional layer comprises a low-molecular weight resin, having a number average molecular weight of about 200 to about 2,000.

13. A multilayer film as claimed in claim 1, wherein said additional layer has been corona or flame treated, so that the surface tension of the film is about 36 to about 50 mN/m.

14. A multilayer film as claimed in claim 1, which is isotropically oriented in such a manner that the elongation at break in both the longitudinal and transverse directions of said multilayer film is less than about 100%.

15. A multilayer film as claimed in claim 1, wherein the film is isotropically oriented in such a manner that the residual elongation in both the longitudinal and transverse directions of said multilayer is greater than about 60%.

16. A multilayer film as claimed in claim 1, wherein the gloss of said multilayer film is greater than about 110.

17. A multilayer film as claimed in claim 1, wherein the thickness of said additional layer is less than about 0.5 μm.

18. A multilayer film as claimed in claim 1, wherein the elongation at break of said multilayer film and the residual elongation of said multilayer film differ by no more than about 10%.

19. A multilayer film as claimed in claim 1, wherein the additional layer has been metallized so as to form a metal layer on said additional layer.

20. A multilayer film as claimed in claim 19, wherein said metal layer comprises aluminum, zinc, gold, silver, or alloys thereof.

21. A multilayer film as claimed in claim 1, comprising two of said additional layers, one on either side of said base layer.

22. A multilayer film as claimed in claim 21, wherein said additional layers comprise the outer layers of the film.

23. A packaging film comprising a multilayer film as claimed in claim 1.

24. A twist wrapping comprising a multilayer film as claimed in claim 1.

25. A multilayer film as claimed in claim 1, which is produced by a process comprising the steps of:
   i) coextruding the melts corresponding to the individual layers of the multilayer film through a flat film die so as to produce a multilayer film,
   ii) solidifying said multilayer film on a chill roll,
   iii) orienting the solidified film in the longitudinal and transverse directions by stretching in such a manner that the film has isotropic properties in both directions, and optionally
   iv) surface treating one or both sides of the oriented multilayer film.

26. A multilayer film as claimed in claim 25, wherein the longitudinal and transverse stretching ratios are both about 6 to about 9.

27. A metallizable, biaxially oriented, transparent multilayer film useful for twist wrapping consisting essentially of a
   a) a base layer consisting essentially of polypropylene, an antistatic agent, and a low-molecular weight hydrocarbon resin having a softening point of about 130° to about 180° C., and
   b) provided on both sides of said base layer, as outer layers of said multilayer film, a layer comprising polypropylene and an antiblocking agent, wherein both of said outer layers comprise substantially no lubricants.

28. A multilayer film as claimed in claim 27, additionally comprising a metal layer adjacent to one of said outer layers.

* * * * *